US012228279B2

(12) United States Patent
Lotti et al.

(10) Patent No.: US 12,228,279 B2
(45) Date of Patent: Feb. 18, 2025

(54) DIRECT-LIGHT GENERATOR FOR SUN-SKY-IMITATING ILLUMINATION DEVICES

(71) Applicant: CoeLux S.r.l., Lomazzo (IT)

(72) Inventors: Antonio Lotti, Arcisate (IT); Chen Li, Zöllnitz (DE); Peter Schreiber, Jena (DE); Bernd Höfer, Jena (DE)

(73) Assignee: CoeLux S.r.l., Lomazzo (IT)

( * ) Notice: Subject to any disclaimer, the term of this patent is extended or adjusted under 35 U.S.C. 154(b) by 561 days.

(21) Appl. No.: 17/442,775

(22) PCT Filed: Mar. 26, 2020

(86) PCT No.: PCT/IB2020/052849
§ 371 (c)(1),
(2) Date: Sep. 24, 2021

(87) PCT Pub. No.: WO2020/201939
PCT Pub. Date: Oct. 8, 2020

(65) Prior Publication Data

US 2022/0163186 A1 May 26, 2022

(30) Foreign Application Priority Data

Mar. 29, 2019 (IT) ........................ 102019000004783

(51) Int. Cl.
*F21V 9/02* (2018.01)
*F21V 3/06* (2018.01)
(Continued)

(52) U.S. Cl.
CPC .............. *F21V 9/02* (2013.01); *F21V 3/0615* (2018.02); *F21V 5/007* (2013.01); *F21V 9/40* (2018.02); *F21V 11/06* (2013.01); *F21Y 2115/10* (2016.08)

(58) Field of Classification Search
CPC ....... F21V 9/02; F21V 5/007; G02B 19/0014; G02B 27/0961; G02B 27/30
See application file for complete search history.

(56) References Cited

U.S. PATENT DOCUMENTS 5,268,977 A 12/1993 Miller
10,775,022 B2 9/2020 Di Trapani et al.
(Continued)

FOREIGN PATENT DOCUMENTS

WO 2009156347 A1 12/2009
WO 2014075721 A1 5/2014
WO 2018157902 A1 9/2018

OTHER PUBLICATIONS

Remko Dinkla, European International Searching Authority, International Search Report and Written Opinion, corresponding PCT Application No. PCT/IB2020/052849, mailed Jul. 14, 2020, 14 pages total.

*Primary Examiner* — William J Carter
(74) *Attorney, Agent, or Firm* — DiBerardino McGovern IP Group LLC

(57) ABSTRACT

The present disclosure is directed to a direct-light generator for sun-sky-imitating illumination devices configured for generating natural light similar to that from the sun and the sky The generator includes a first emitting surface and an array of light-emitting devices configured to generate from a primary light a direct light which exits the first emitting surface along a direct-light direction. The direct light exiting the first emitting surface has a luminance profile which has a narrow peak in the angular distribution around the direct-light direction and is uniform across the first emitting surface. Each light-emitting device includes a light emitter having an emitting surface and at least a pair of collimation lenses illuminated by the light emitter.

22 Claims, 6 Drawing Sheets

(51) Int. Cl.

| | |
|---|---|
| ***F21V 5/00*** | (2018.01) |
| ***F21V 9/40*** | (2018.01) |
| ***F21V 11/06*** | (2006.01) |
| *F21Y 115/10* | (2016.01) |

(56) References Cited

U.S. PATENT DOCUMENTS

2015/0109773 A1* 4/2015 Li ............................ F21V 5/007
362/231
2015/0211709 A1 7/2015 Uchida et al.
2015/0316231 A1 11/2015 Di Trapani

* cited by examiner

DIRECT-LIGHT GENERATOR FOR SUN-SKY-IMITATING ILLUMINATION DEVICES

TECHNICAL FIELD

The present disclosure generally relates to direct-light generators for sun-sky-imitating illumination devices which realize the perception of the natural light from the sun and the sky.

More precisely, the perception of the natural light from the sky and the sun is related both to the capacity of the illumination device to illuminate an ambient with effects very similar to the effects that would manifest in the same room if an aperture with sky and sun beyond it, i.e. a window, would be positioned at the same place, and also to the appearance of the device itself when directly viewing at it, which creates the visual appearance of infinite depth for the sky and infinite position of the sun sources. Therefore, the direct-light generators for sun-sky-imitating illumination devices need to fulfill two main aims, namely

- to generate light with a luminance profile similar to that of the light from the sun to allow the direct light emitted by the sun-sky-imitating illumination device to cast object shadows and
- to offer a uniform visual appearance of the illumination device itself to allow the sky and sun scene to be perceived as having infinite depth.

BACKGROUND

For the requirement concerning the illumination of an ambient for the perception of natural light from sky and sun, reference can be made to the illumination devices described in WO 2009/156347 A1 submitted by the same Applicant. One of these illumination devices, comprises a broadband, spot like, light source and a Rayleigh scattering panel placed at a certain distance from the source. The panel separates the light rays from the source into a transmitted component with Correlated Color Temperature (CCT) lower than that of the source, and into a diffused component with higher CCT, the difference in CCT being due to the fact that the scattering efficiency increases with the inverse of the fourth power of the wavelength in the addressed Rayleigh regime. As long as the light source is small in comparison to the panel, the direct light is able to cast object shadows, which are bluish under the diffused cold light caused by the panel.

However, the devices described in WO 2009/156347 A1 do not properly satisfy the requirements concerning the visual appearance of the illumination device itself when directly viewing at it. In fact, an observer who sees the source through the panel does not see it at infinity, but at the given spatial position at which the light source is positioned. The divergence of the direct-light rays implies that neither the direction under which the spot of the artificial sun is seen nor the aperture angle (penumbra) is fixed, but they depend on the observer's position and on his/her distance from the source. Such visual cues prevent the observer to naturally interpret the light source as located at infinite distance, i.e. the visual cues prevent the sky and sun scene from being perceived as having infinite depth, the source itself defining the limit depth of the scene.

Patent application WO 2014/075721A1 filed by the same applicant describes an artificial illumination device which successfully achieves to form shadows that are parallel, sharp and more bluish than the rest of illuminated scene, so as to make an observer experience an infinite visual depth perception of a sky and sun image when he/she directly looks at said artificial illumination device, without inter- and intra-conflicts among visual perception cues. The device of WO 2014/075721A1 makes use of a direct-light source capable of generating light with a luminance profile similar to that of the light from the sun, and a diffused-light generator positioned downstream the direct light source, which is at least partially transparent to the impinging light and is configured to emit a diffused light having a higher CCT than the CCT of the light generated by the direct light source. In detail, the direct-light source described in WO 2014/075721A1 is configured to produce, from a primary light, a direct light which exists an emitting surface with a luminance profile Ldirect(x, y, θ, φ) which is uniform (with respect to the spatial dependence) across the emitting surface and has a narrow peak (i.e. with respect to the angular dependence) along a direct light direction, wherein x and y are the transverse coordinates along perpendicular axes x and y spanning the emitting surface, θ is the polar angle measured relative to the direct-light direction, and φ is the azimuthal angle. The term "narrow" is, in general, interpreted as implying that Ldirect(x, y, θ, φ) has a peak subtended by a solid angle which is significantly smaller than 2π sr, e.g. smaller than 0.4 sr. Owing to the fact that the diffused-light generator is at least partially light-transparent, at least a portion of the direct light propagates downstream the diffused-light generator. As a consequence, the outer light comprises a first light component which propagates along directions contained within the narrow peak and a second light component which propagates along directions spaced apart from the narrow peak, with the first light component having a CCT which is lower than a CCT of the second light component.

In order to achieve the above identified luminance angular profile constraints, WO 2014/075721A1 describes a direct-light source which makes use of a filtering layer positioned downstream of a collimated light source with a substantially uniform dark background. The filtering layer is chosen to be able to transform a collimated beam featured by the presence of stray light that originates from the collimated light source and impinges onto the filtering layer, into a second collimated beam with divergence substantially equal to the divergence of the first collimated beam and which is free from stray light. In the embodiments described in WO 2014/075721A1 the filtering layer consists of a microstructure comprising two-dimensional arrays of microlenses and microtubes of absorbing material which need to satisfy very high constraints in terms of degree of precision in their geometry and relative positioning in order to correctly transform the first collimated beam into the second collimated light beam by eliminating stray light only.

Applicant realized that the embodiments of the direct-light source provided in WO 2014/075721A1 may still in some cases exhibit minor problems in achieving the required spatial uniformity across the emitting surface, e.g. due to chromatic aberration introduced by the collimated light source. In detail, all the embodiments of WO 2014/075721A1 show a main collimation stage which is configured to perform a very deep collimation action (intrinsically coupled to chromatic aberration) in order to meet the desired collimation constraints given for achieving a realistic sky and sun imitating effect. The Applicant realized that this applies also to the embodiments of WO 2014/075721A1 which comprise a sort of pre-collimation stage, which, despite of their pre-collimating effect, are not capable to effectively reduce chromatic aberration so far as to fully meet the requirement relating to spatial uniformity across the emitting surface.

Accordingly, the present disclosure is directed, at least in part, to improving or overcoming one or more aspects of prior systems and particularly to a solution which is capable of achieving the above identified luminance angular profile constraints by means of a simple structure which minimizes chromatic aberration and concurrently achieves the required strong collimation.

SUMMARY OF THE DISCLOSURE

In a first aspect, the present disclosure is directed to a direct-light generator for sun-sky-imitating illumination devices configured for generating natural light similar to that from the sun and the sky, comprising a first emitting surface and an array of light-emitting devices configured to generate from a primary light a direct light which exits the first emitting surface along a direct light direction, wherein the direct light exiting the first emitting surface has a luminance profile Ldirect which has a narrow peak in the angular distribution around the direct-light direction and is uniform across the first emitting surface, wherein each light-emitting device comprises a light emitter and at least a pair of collimation lenses illuminated by the light emitter, each pair of collimation lenses comprising a pre-collimation lens comprising a light inlet surface facing the light emitter and a light outlet surface, the pre-collimation lens being positioned proximal to the light emitter, and a collimation lens comprising a light input surface and a light output surface, the collimation lens being positioned distal from the light emitter, the light emitter and the pre-collimation lens being housed in a hollow housing which is internally coated or made of light absorbing material and has at least an aperture where the collimation lens is positioned, wherein the pre-collimation lens of each pair of collimation lenses is configured to emit with a substantially angularly constant intensity and to uniformly illuminate a whole light input surface of the collimation lens of the pair of collimation lenses wherein, with the pre-collimation lens having a pre-collimation lens height b2, and a base of the input surface of the collimation lens being spaced apart from a base of the inlet surface of the pre-collimation lens of a lenses distance h, the ratio b2/h between the pre-collimation lens height b2 and the lenses distance h is comprised in the range of 0.2-0.8, more preferably in the range between 0.25-0.75 and even more preferably in the range between 0.3-0.7, and/or, with the pre-collimation lens having a pre-collimation lens maximum width b1 and the collimation lens having a collimation lens maximum width C, the ratio b1/C between the pre-collimation lens maximum width b1 and the collimation lens maximum width C is comprised in the range of 0.3-0.8, more preferably in the range between 0.35-0.75 and even more preferably in the range between 0.4-0.7.

Within the scope of the present description and appended claims, the term "pre-collimation lens height" refers to the distance between the intersection points between a straight line orthogonal to plane comprising the light emitter emitting surface and passing through a center of mass of the pre-collimation lens and (a) the pre-collimation lens inlet surface and (b) the pre-collimation lens outlet surface, respectively.

Within the scope of the present description and appended claims, the term "light emitter emitting surface" refers to the emitting surface of the light emitter facing the pre-collimation lens.

Within the scope of the present description and appended claims, the term "base of the lens input/inlet surface" refers to the nearest parallel plane to the light emitter emitting surface still intersecting at least a point of the lens input/inlet surface.

Within the scope of the present description and appended claims, the term "lens maximum width" refers to the maximum value between a plurality of local width values each referring to a plane which intersect the lens parallel to the light emitter emitting surface, wherein each local width value is defined as the maximum distance between any two points comprised in a section area defined by the intersection of the lens with the corresponding parallel plane.

Within the scope of the present description and appended claims, the term "narrow peak" is interpreted as saying that the luminance profile L (x, y, θ, φ) of the light has a peak subtended by a solid angle which is significantly smaller than 2π sr, e.g. smaller than 0.4 sr, preferably smaller than 0.3 sr, more preferably smaller than 0.2 sr. In other words, a narrow peak is characterized by a polar angle profile, averaged over all azimuthal angles, with a HWHM (half width at half maximum) significantly smaller than 45°, e.g. smaller than 20°, preferably smaller than 15°, more preferably smaller than 10°.

Within the scope of the present description and appended claims, the term "uniform luminance" is interpreted as saying that the luminance profile L (x, y, θ, φ) of the light shows minimal spatial amplitude fluctuations for polar angle θ greater than 2 $\theta_{HWHM}$, where $\theta_{HWHM}$ is the HWHM of the polar angle profile, averaged over all azimuthal angles, of the luminance profile itself; e.g. the ratio between a standard deviation of said luminance spatial fluctuations and the luminance average value may not exceed the value of 0.3, preferably not exceed the value of 0.1, within any 10 mm diameter spatial circular areas and for at least 90% of the light-emitting surface, and may not exceed the value of 0.4, preferably not exceed the value of 0.3, more preferably not exceed the value of 0.2, within the entire at least 90% of the light-emitting surface, for any fixed azimuthal angle φ and for any fixed polar angle θ greater than 2 $\theta_{HWHM}$.

Additionally, the term "uniform luminance" is also interpreted as saying that, for polar angle θ smaller than $\theta_{HWHM}$, the luminance profile L (x, y, θ, φ) of the light does not exhibit fluctuations in a (local) polar angle leading to (local) maximum luminance with standard deviation larger than 0.5 $\theta_{HWHM}$ by varying spatial coordinates within areas of 5 cm diameter, preferably 10 cm diameter, more preferably 20 cm diameter, and does not exhibit fluctuations in the (local) polar angle leading to (local) maximum luminance with standard deviation larger than $\theta_{HWH}$ by varying spatial coordinates within the entire at least 90% of the entire light-emitting surface.

The Applicant first considered to use a pre-collimation lens having dimensions in the same range or comparable to the dimensions of the light emitter, as usually done in practice but realized that the standard pre-collimation lens dimensions do not allow to minimize chromatic aberration. The Applicant realized thus that in order to achieve the best trade-off between collimation and chromatic aberration which allows to meet the above discussed luminance angular profile constraints, some specific ratios between the dimensions and the positioning of the pre-collimation lens with respect to the collimation lens needed to be met.

Through an innovative calculation approach, the Applicant found that—contrary to expectations—pre-collimation lenses with relatively larger dimensions than light emitters dimensions, e.g. in the range between five-to-one and twenty-five-to-one, had be used. Applicant's discovery led to surprising ratios between the dimensions of the pre-collimation lens and of the collimation lens, namely to ratios much higher than expected. In detail, the Applicant unexpectedly discovered that the dimensional relation between the dimensions of the pre-collimation lens and of the collimation lens is higher than one-to-five (0.2) and preferably roughly around one-to-three/one-to-two (0.3-0.5).

In detail, the Applicant started from the assumption of a very small light emitter (point light source) with Lambertian emission and mapped each light ray emitted by light emitter into a corresponding light ray exiting from the pre-collimation lens, with the set of exiting light rays chosen so as to uniformly illuminate the whole light input surface of the collimation lens positioned downstream. By considering that each emitted light ray experiences refraction twice when passing through the lower and the upper surface of the pre-collimation lens, the Applicant contemplated to model each surface point of the pre-collimation lens so as to have the condition of lowest deviation angle fulfilled, namely when the light ray incident on the lower surface forms the same deviation angle as the light ray exiting the upper surface forms with the refracted ray inside the pre-collimation lens. Indeed, the Applicant had the idea to uniformly distribute refraction between the lower and the upper lens surface in order to minimize aberration. By setting these assumptions as conditions for the subsequent optimization calculations, the Applicant surprisingly obtained the above defined ratios between the dimensions of the pre-collimation lens and of the collimation lens.

In a second aspect, the present disclosure is directed to a direct-light generator for sun-sky-imitating illumination devices configured for generating natural light similar to that from the sun and the sky, comprising a first emitting surface and an array of light-emitting devices configured to generate from a primary light a direct light which exits the first emitting surface along a direct light direction, wherein the direct light exiting the first emitting surface has a luminance profile Ldirect which has a narrow peak in the angular distribution around the direct-light direction and is uniform across the first emitting surface, wherein each light-emitting device comprises a light emitter and at least a pair of collimation lenses illuminated by the light emitter, each pair of collimation lenses comprising a pre-collimation lens comprising a light inlet surface facing the light emitter and a light outlet surface, the pre-collimation lens being positioned proximal to the light emitter, and a collimation lens comprising a light input surface and a light output surface, the collimation lens being positioned distal from the light emitter, the light emitter and the pre-collimation lens being housed in a hollow housing which is internally coated or made of light absorbing material and has at least an aperture where the collimation lens is positioned, wherein the pre-collimation lens of each pair of collimation lenses is configured to emit with a substantially angularly constant intensity and to uniformly illuminate a whole light input surface of the collimation lens of the pair of collimation lenses, wherein the pre-collimation lens has a convex-curved light outlet surface and a concave-curved light inlet surface facing the light emitter.

Through the innovative calculation approach applied by the Applicant, it was realized that the best tradeoff between chromatic aberration and collimation is achieved by using a pre-collimation lens with a convex-curved light outlet surface in combination with a concave-curved light inlet surface facing the light emitter.

The present invention in at least one of the above aspects may have at least one of the following preferred features; the latter may in particular be combined with each other as desired to meet specific implementation purposes.

According to a variant of the invention, the ratio C/h between the maximum width C and the distance h, and the ratio b1/b2 between the width b1 and the height b2 range between 0.8-1.6, more preferably between 0.85 and 1.4, even more preferably between 0.90 and 1.3.

Applicant unexpectedly identified that the best tradeoff between collimation and chromatic aberration which allows to meet the above discussed luminance angular profile constraints is achieved by means of a design in which the relation between the dimensions (width and heights) of the pre-collimation lens substantially correspond to the relation between the width of the collimation lens and the distance between the lenses.

According to a variant of the invention, the light emitter emitting surface is spaced apart from the light inlet surface of the pre-collimation lens of a gap having a maximum value comprised between 0.01 and 0.04 times the lenses distance h, preferably 0.015-0.035 times the lenses distance h, even more preferably substantially equal to 0.025 times the lenses distance h.

Advantageously, the reduced distance between the light emitter emitting surface and the inlet surface of the pre-collimation lens allows to improve the light collection efficiency.

According to a variant of the invention, the ratio a1/b1 between a width a1 of the light emitter emitting surface, with a1 being measured as maximum distance between any two points comprised in the light emitter emitting surface, and the pre-collimation lens maximum width b1, ranges between 0.2 (1:5) and 0.04 (1:25).

According to a variant of the invention, the pre-collimation lens has a first optical axis and the light outlet surface of the pre-collimation lens is convex-curved with a first radius of curvature r1 measured at the first optical axis, and the collimation lens has a second optical axis and the light output surface of the collimation lens is convex-curved with a second radius of curvature r2 measured at the second optical axis.

Preferably, a ratio r2/r1 between the second radius of curvature r2 of the light output surface of the collimation lens and the first radius of curvature r1 of the light outlet surface of the pre-collimation lens ranges between 1.5 and 6, or preferably between 1.5 and 10.

Advantageously, the optimized ratio between the second radius of curvature and the first radius of curvature allows to optimize the dimensions and relative positioning of the lenses in order to meet the above defined constraints on light collimation and chromatic aberration within reduced volumes. This also allows to make the manufacturing of the light-emitting devices simpler and to reduce the production costs.

Preferably, the light outlet surface of the pre-collimation lens and/or the light output surface of the collimation lens have a spherical or an aspheric profile.

According to a variant of the invention, the hollow housing is internally coated or made of light absorbing material having an absorption coefficient for visible light preferably greater than 70%, more preferably greater than 90%, even more preferably greater than 95%.

Preferably, the hollow housing comprises at least one perimetric baffle structure projecting from an inner wall of the hollow housing towards the inside of the hollow housing and configured to prevent that pre-collimated light exiting the light outlet surface of the pre-collimation lens impinges onto the inner wall of the hollow housing.

Advantageously, this allows to minimize stray light by preventing possible reflections due to a non-ideality in the absorption offered by the hollow housing inner walls.

According to a variant of the invention, the at least one perimetric baffle structure is positioned more proximal to the input surface of the collimation lens than to the inlet surface of the pre-collimation lens.

Preferably, the first baffle structure is positioned at a distance from the input surface of the collimation lens which is less than half of the lenses distance.

More preferably, the first baffle structure is positioned at a distance from the input surface of the collimation lens that is less than a third of the lenses distance h.

According to a variant of the invention, the at least one perimetric baffle structure has a wedge-shaped cross-section with a side of the perimetric baffle structure facing the pre-collimation lens being parallel to the collimation lens input surface base.

According to another variant of the invention, the light input surface of the collimation lens has a third radius of curvature r3 measured at the second optical axis, the third radius of curvature r3 being larger than the second radius of curvature r2 of the light output surface of the collimation lens.

Preferably, the third radius of curvature r3 of the light input surface of the collimation lens is larger than three times the second radius of curvature r2 of the light output surface of the collimation lens.

More preferably, the third radius of curvature r3 of the light input surface of the collimation lens is larger than five times the second radius of curvature r2 of the light output surface of the collimation lens.

Even more preferably, the third radius of curvature r3 of the light input surface of the collimation lens is larger than ten times the second radius of curvature r2 of the light output surface of the collimation lens.

Preferably, the curvature profiles of the light inlet and/or of the light outlet surface of the pre-collimation lens may be spherical, aspheric, or be a hyper-hemisphere. In alternative, the light inlet surface may have a section featuring two concave bows Not least, the pre-collimation lens is a singlet or doublet of two different materials.

According to a variant of the invention, the pre-collimation lens comprises a concave-curved light inlet surface facing the light emitter and a convex-curved light outlet surface, the inlet and the outlet surfaces preferably having an aspheric profile.

Preferably, the pre-collimation lens is a singlet made of a thermoplastic polymer, preferably PMMA (Polymethylmethacrylate).

According to a variant of the invention, the pre-collimation lens is a thermoplastic polymer doublet, preferably made of PC and PMMA.

According to a further variant of the invention, the pre-collimation lens of each pair of collimation lenses comprises a planar light inlet surface facing the light emitter and a convex-curved light outlet surface, the outlet surface preferably having a spherical profile.

Preferably, the pre-collimation lens is a glass doublet.

According to a variant of the invention, the direct-light generator further comprises a channel structure positioned downstream of the array of light-emitting devices and upstream from the first emitting surface, the channel structure being configured to transform a first collimated light beam featured by the presence of stray light emitted by the light-emitting devices and that impinges onto the channel structure into a second collimated light substantially free from stray light propagating at an angle higher than a cut angle $\alpha$_cut.

Preferably, the channel structure is made of a plurality of channels optionally formed by void volumes separated by walls, wherein the walls separating the void volumes of the channels are optionally made of or coated with a light absorbing material having an absorption coefficient for visible light preferably greater than 70%, more preferably 90%, even more preferably 95%.

More preferably, the channels are distributed adjacent to each other in a close-packing arrangement.

According to the above description, the several features of each embodiment can be unrestrictedly and independently combined with each other in order to achieve the advantages specifically deriving from a certain combination of the same.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure.

In the drawings.

DETAILED DESCRIPTION

Figure 1:
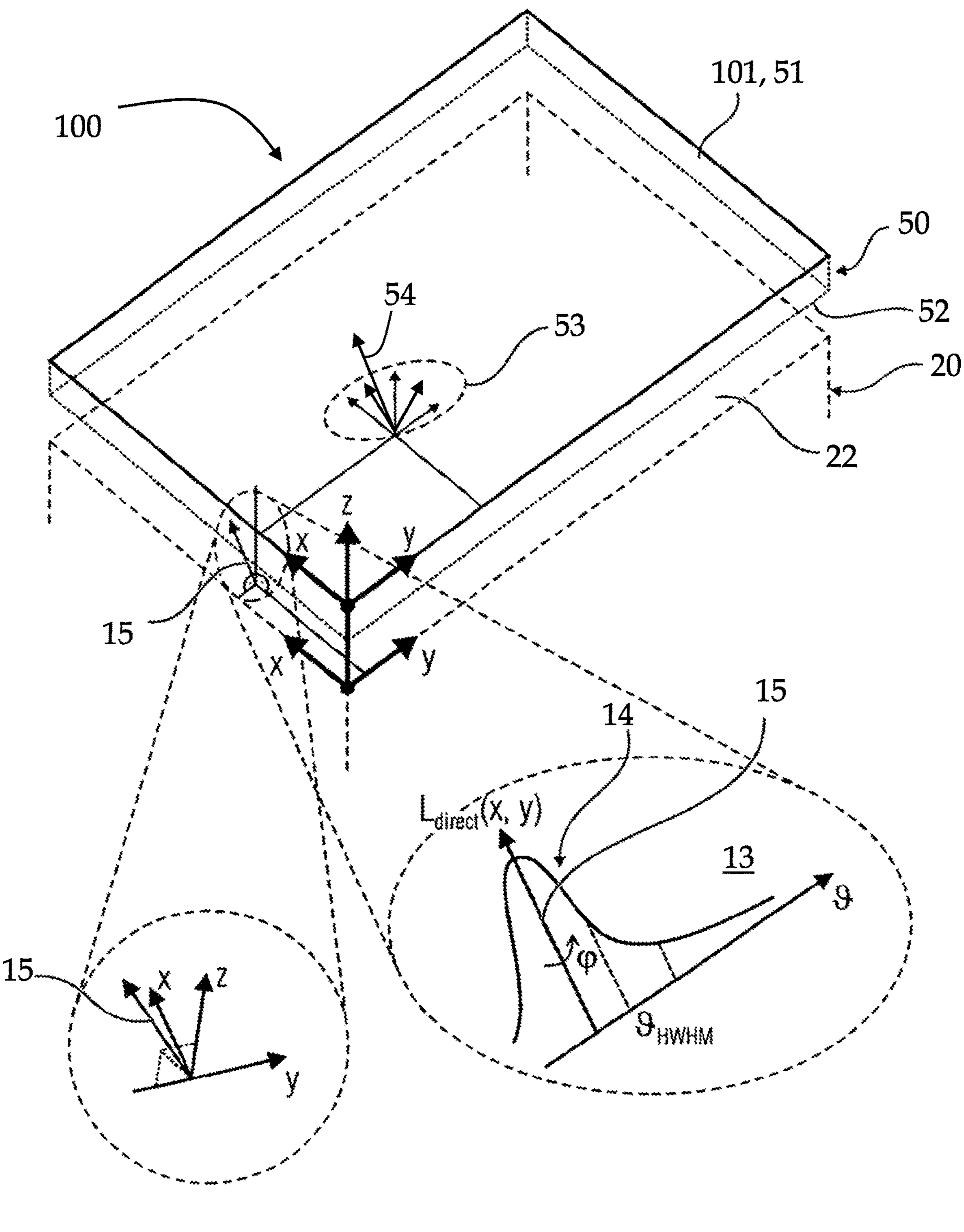
FIG. 1 schematically shows a sun-sky-imitating illumination device with additionally schematically showing the luminance profile of the direct light.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

FIG. 1 schematically illustrates a sun-sky-imitating illumination device 100 which is capable of illuminating an ambient as the sun and the sky do through a window, and which guarantees at the same time a visual appearance of the illumination device that offers the experience of virtually infinite depth as the sky and the sun do in nature when they are observed through a window. In other terms, FIG. 1 illustrates a sun-sky-imitating illumination device for generating natural light as the sun and the sky, i.e. having a luminance profile and an appearance similar to that of the light from the sun and the sky.

The sun-sky-imitating illumination device 100 of FIG. 1 comprises a direct-light generator 20. Merely a first emitting surface 22 of the direct-light generator is shown for sake of intelligibility of FIG. 1. However, the direct-light generator 20 comprises one or more light-emitting devices 21 (shown in FIGS. 2 and 4 to 6) configured to emit primary light and positioned upstream relative to the light-emitting surface 22, wherein the term "upstream" is defined with respect to the light propagation direction.

The direct-light generator 20 is configured to produce from the primary light a direct light 13 which exits the first emitting surface 22 with a luminance profile Ldirect (x, y, θ, φ) which is uniform (e.g. with respect to the spatial dependence) across the first emitting surface 22 and has a narrow peak 14 with respect to the angular dependence along a direct light direction 15, wherein x and y are the transverse coordinates along axes x and y spanning the first emitting surface 22, 0 is the polar angle measured relative to the direct-light direction 15, and φ is the azimuthal angle.

Moreover, the sun-sky-imitating illumination device of FIG. 1 also comprises a diffused-light generator 50 positioned downstream of the first emitting surface 22, wherein the term "downstream" is defined to follow the light propagation direction.

The diffused-light generator 50 comprises a second emitting surface 51 (or diffuser emitting surface 51) and a diffuser input surface 52 facing opposite to the diffuser emitting surface, and is configured to be, at least partially, transparent to the light impinging onto the input surface 52. Moreover, the diffused-light generator 50 is configured to emit a diffused light 53 from the second emitting surface 51, wherein said diffused light 53 is the component of the outer light which exist the second emitting surface 51 being scattered in virtually all forward directions and being uniform or at least weakly dependent on the spatial coordinates x,y. For example, the diffused-light generator 50 is configured to emit a diffused light over a solid angle which is at least 4 times larger, preferably 9 times larger, more preferably 16 times larger than the solid angle subtending the narrow peak 14.

In a different embodiment (not shown) the mutual positions of the first emitting surface 22 and the second emitting surface 51 is inverted with respect to the case of FIG. 1. In other words, in the case of FIG. 1, the second emitting surface 51 forms an outer surface 101 of the device 100, whereas in case of inverted positioning, the first emitting surface 22 forms the outer surface 101 of the device 100.

In addition, the sun-sky-imitating illumination device 100 is configured so that the direct light 13 produced by the direct-light generator 20 has a CCT which is lower than a CCT of the diffused light 53 (e.g. at least 1.2 times lower, preferably 1.3 times lower, more preferably 1.4 times lower). Owing to the fact that the diffused-light generator 50 is at least partially light-transparent, at least a portion of the direct light 13 propagates downstream the second emitting surface 51. As a consequence, the outer light comprises a first direct light component 54 which propagates along directions contained within the narrow peak 14 (for example along at least 90% of the directions subtending the narrow peak 14, i.e. 90% of the directions with polar angle θ smaller than the HWHM polar angle of the narrow peak) and a second diffused light component 53 which propagates along directions spaced apart from the narrow peak 14, e.g. directions spanning at least 30%, preferably 50%, most preferably 90% of the angular region outside the cone with axis directed along direction 15 and half-aperture 3 times larger than the HWHM polar angle of the narrow peak, wherein the first light component has a CCT which is lower than a CCT of the second light component (e.g. at least 1.2 times lower, preferably 1.3 times lower, more preferably 1.4 times lower).

The above described uniformity condition on the luminance profile of the direct light 13 exiting the direct-light generator 20 results in a uniform illuminance profile at the diffuser input surface 52 and, accordingly, a uniform luminance profile of the direct light component 54 which exits the second emitting surface 51. This allows avoiding visual perception cue conflicts which would lead to a depth perception different from an infinite depth perception for any cue among the accommodation, the binocular-convergence and the motion parallax visual cues. Moreover, the above condition on the narrow peak of the luminance profile of the direct light 13 and, accordingly, of the direct light component 54, plays a key role in the visual appearance of a prevailing infinite depth perception.

Figure 2:
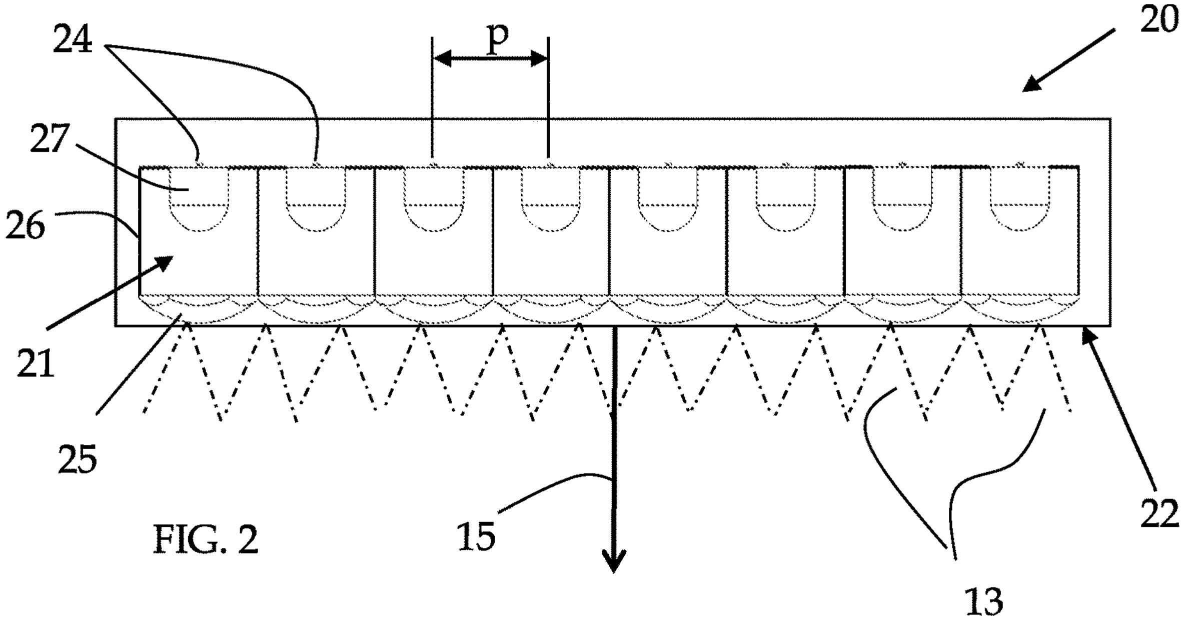
FIG. 2 schematically shows a sectional view of a first variant of a direct-light generator for sun-sky-imitating illumination devices according to the present invention.

FIG. 2 shows a first variant of the direct-light generator 20 according to the invention. The direct-light generator 20 comprises an array (e.g. two-dimensional) of light-emitting devices 21. In particular, each light emitting device 21 comprises a light emitter 24, such as a light emitting diode comprising phosphor and/or dye or the like, to which a pair of collimation lenses 27,25 is associated. Optionally, the light emitters 24 have a circular cross section in a plane perpendicular to the direct light direction 15, in order to facilitate the achievement of a luminance distribution independent of the azimuthal coordinate. For the same purpose, non-circular light emitters may comprise circular apertures, which trim their cross-sections in a circular shape.

Figure 2A:
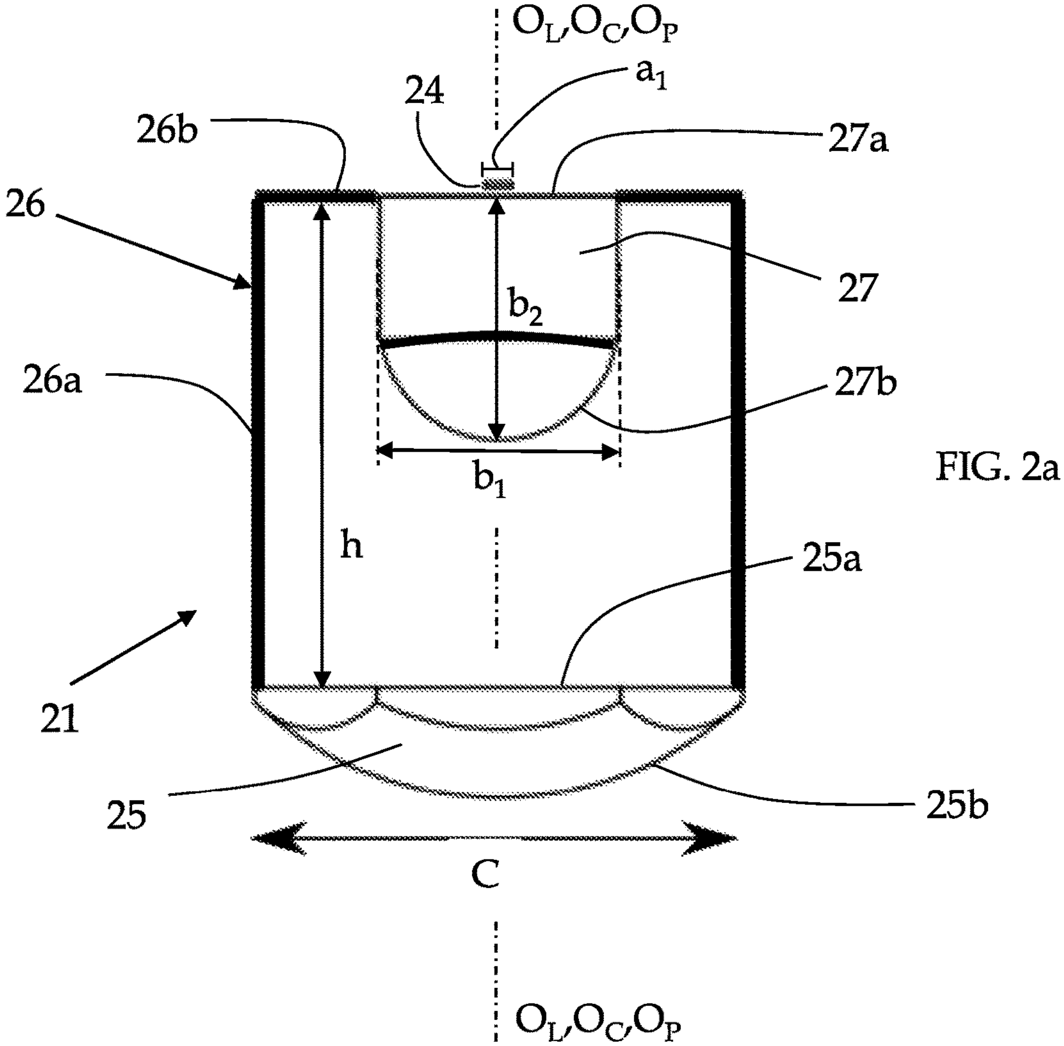
FIG. 2*a* is an enlarged view of a detail of the direct-light generator according to the first variant of FIG. 2.

The pair of collimation lenses 27,25 comprises a pre-collimation lens 27 and a collimation lens 25 positioned downstream of the pre-collimation lens 27 with respect to the light propagation direction. The pre-collimation lens 27 is positioned substantially in contact with (as shown in FIGS. 2*a* and 5*a*) or proximal to (as shown in FIG. 4*a*) an emitting surface of the light emitter 24 and is configured to perform a pre-collimation of the light emitted by the light emitter 24 through the emitting surface in order to reduce its divergence (e.g. approximately to 40°-50°). Each light emitter 24 and each pre-collimation lens 27 of the pair of collimation lenses are housed in a dark hollow housing 26 which comprises a tubular wall 26*a* internally made of light absorbing material and having an aperture where the collimation lens 25 of the pair of collimation lenses is positioned. Optionally, the hollow housing 26 also comprises a bottom wall 26*b* at the opposite end of the tubular wall 26*a* with respect to the aperture where the collimation lens 25 is positioned. The tubular wall 26*a* of the dark housing 26 is internally made of or coated with a material that has an absorption coefficient η_abs for visible light preferably greater than 70%, more preferably 90%, even more preferably 95%.

The second collimation lens 25 is positioned at a distance from a virtual image of the light emitter 24 generated by the pre-collimation lens 27 substantially equal to the focal length of the second collimation lens 25. The pair of collimation lenses 27,25 is configured to obtain a uniform spatial distribution of the illuminance projected onto a surface directly downstream of the first emitting surface 22. The pre-collimation lens 27 is configured to emit with a uniform angular profile within an emission cone having a half angular aperture preferably comprised between 10° and 36°, more preferably between 13° and 33°, even more preferably between 18° and 30°, namely with an angularly constant intensity, and to uniformly illuminate a whole light input surface 25*a* of the collimation lens 25. In detail, the pre-collimation lens 27 is configured to flatten the illuminance distribution of the light emitted by the light emitter 24 onto the collimation lens input surface 25*a*.

In the first variant of FIG. 2, the first pre-collimation lens 27 comprises a planar light inlet surface 27*a* facing the light emitter 24 emitting surface and a convex-curved light outlet surface 27*b*. In particular, the outlet surface 27*b* has spherical profile. The pre-collimation lens 27 of the embodiment of FIG. 2 is made as glass achromat doublet, namely an ensemble of two individual lenses made from glasses with different refractive indices and/or different amounts of dispersion, optimized to reduce chromatic aberration. By way of example, one lens may be concave and made out of flint glass and the second lens may be convex and made of crown glass. The individual lenses are typically mounted next to each other, often cemented together, and shaped so that the chromatic aberration of one is counterbalanced by that of the other.

In detail, the first pre-collimation lens 27 has a first optical axis $O_P$ and the convex-curved light outlet surface 27*b* of the pre-collimation lens 27 has a first radius of curvature r1 at the first optical axis $O_P$. Moreover, the collimation lens 25 has second optical axis $O_C$ and the convex-curved light output surface 25*b* of the collimation lens 25 has a second radius of curvature r2 at the second optical axis $O_C$. Advantageously, the first radius of curvature r1 is smaller than the second radius of curvature r2. Furthermore, the collimation lens input surface 25*a* of the embodiment of FIG. 2 is flat (accordingly with an infinite third radius of curvature r3). In other variants of the invention, the collimation lens input surface 25*a* may be curved. Moreover, the pre-collimation lens 27 and the collimation lens 25 and their relative positioning satisfy specific dimensional relations identified by Applicant based on extensive experimental tests. In detail, Applicant identified the dimensional relations and relative positioning which optimize light emission in terms of best trade-off between collimation effect and minimal chromatic aberration.

As shown in FIG. 2*a*, the pre-collimation lens 27 is characterized by a maximum width b1 and a height b2. The pre-collimation lens height b2 refers to the distance between the intersection points between a straight line orthogonal to a plane comprising the light emitter 24 emitting surface and passing through a center of mass of the pre-collimation lens 27 and respectively, (a) the pre-collimation lens inlet surface 27*a* and (b) the pre-collimation lens outlet surface 27*b*. In the embodiment shown in FIG. 2*a*, the straight line orthogonal to a plane comprising the light emitter 24 emitting surface and passing through the center of mass of the pre-collimation lens 27 coincides with the optical axis $O_P$ due to the symmetric shape of the pre-collimation lens 27. The pre-collimation lens maximum width b1 refers to the maximum value between a plurality of local width values each referring to a (different) plane which intersect the pre-collimation lens 27 parallel to the light emitter 24 emitting surface, wherein each local width value is defined as the maximum distance between any two points comprised in a section area defined by the intersection of the pre-collimation lens 27 with the corresponding parallel plane.

The pre-collimation lens 27 is positioned at a distance h from the collimation lens 25 (measured between a base of the inlet surface 27*a* and a base of the input surface 25*a*) and is characterized by a maximum width C of the collimation lens 25 (measured analogously as defined for the maximum width of the pre-collimation lens 27). The base of the lens input/inlet surface 27*a*,25*a* refers to the nearest parallel plane to the light emitter 24 emitting surface still intersecting at least a point of the lens input/inlet surface 27*a*,25*a*.

With respect to the above dimensions, Applicant unexpectedly identified that in order to minimize chromatic aberration and concurrently maximize light collimation offered by the light-emitting devices 21, the relation between the distance h and the width C of the collimation lens 25 substantially corresponds to the relation between the height b2 and the width b1 of the pre-collimation lens 27. In detail, Applicant identified that, both, the ratio C/h and the ratio b1/b2 are preferably comprised in the range of 0.8-1.6, more preferably comprised between 0.85 and 1.4, even more preferably between 0.90 and 1.3. Moreover, Applicant unexpectedly identified that the ratio b2/h between the height b2 of the pre-collimation lens 27 and distance h is comprised in the range of 0.2-0.8, more preferably in the range between 0.25-0.75 and even more preferably in the range between 0.3-0.7. Analogously, Applicant further identified that the ratio b1/C between the pre-collimation lens width b1 and the collimation lens width C is comprised in the range of 0.3-0.8, more preferably in the range between 0.35-0.75 and even more preferably in the range between 0.4-0.7. Applicant also identified that the ratio r2/r1 between the radius of curvature r2 of the light output surface 25*b* of the collimation lens 25 and the radius of curvature r1 of the light outlet surface 27*b* of the pre-collimation lens 27 is comprised between 1.5 and 6, more preferably between 1.5 and 10. Not least, Applicant also identified that the ratio a1/b1 between a width a1 of the light emitter 24 emitting surface (measured as maximum distance between any two points comprised in the light emitter 24 emitting surface) and the pre-collimation lens 27 maximum width b1 preferably ranges between 0.2 (1:5) and 0.04 (1:25). The combination of these relations assures the best distribution between the pre-collimating and the subsequent collimating action, thereby obtaining a highly collimated light (e.g. with a peak in the polar angle profile having HWHM preferably smaller than 10°) with minimal chromatic aberration.

Figure 3:
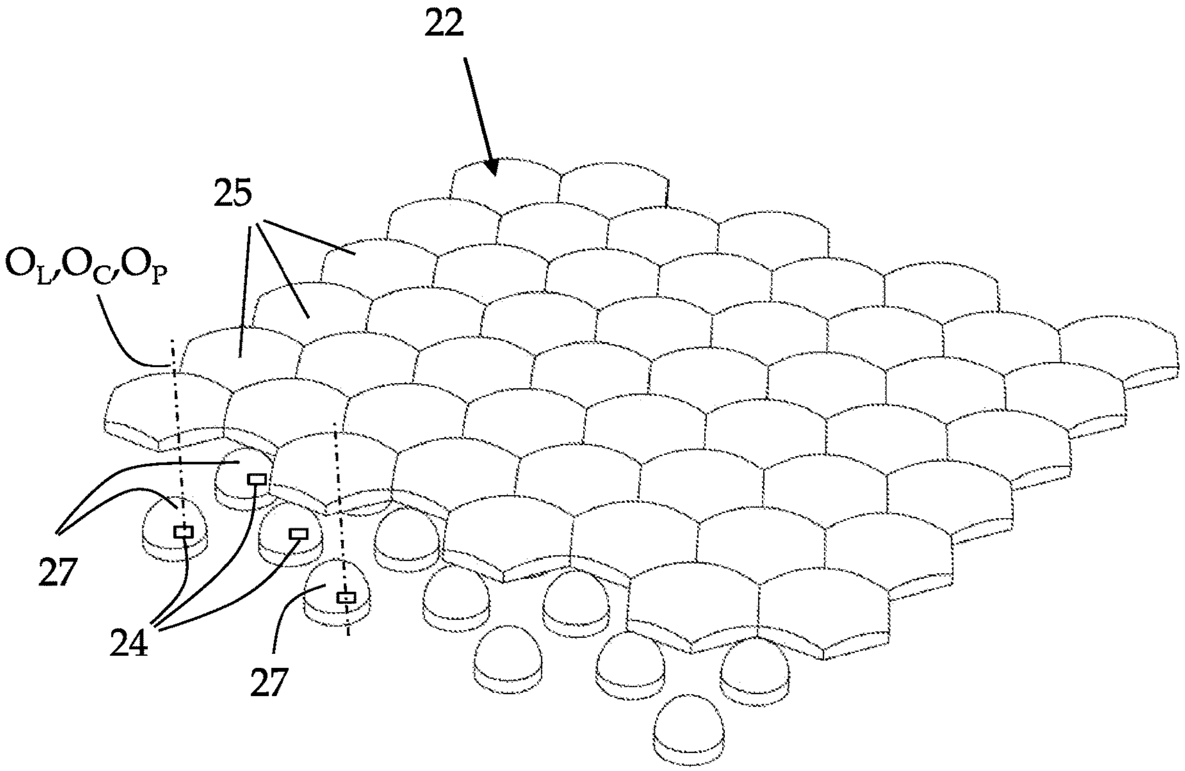
FIG. 3 schematically shows a three-dimensional view of an array of triplets of light emitter, pre-collimation lens and collimation lens so as to result in a direct-light generator in accordance with the variant of FIG. 2.

As shown in FIG. 3, each triplet of light emitter 24, pre-collimation lens 27 and respective collimation lens 25 may be packed closely, such as in a hexagonal manner so as to form a honeycomb structure, and in juxtaposition so that the collimation lenses 25 of the triplets have hexagonal section and abut each other so as to form a joined continuous surface that covers an area substantially as wide as the first emitting surface 22. Additionally to output surface 22, the joined continuous surface comprises regions from which no collimated light exits, like e.g. the perimeter lines of the collimation lenses 25 which overlap the perimeter lines of the dark housings 26.

The packing of the triplets may be with a pitch p that is usually smaller than 6 cm, preferably smaller than 4 cm, more preferably smaller than 1 cm. The optical axes $O_L$,Op, Oc of the individual pairs of light emitter 24, pre-collimation lens 27 and collimation lens 25 may be arranged to extend parallel to each other and parallel to the direct-light direction 15, respectively. However, the array of collimation lenses 25 and the array of light emitters 24 and pre-collimation lenses 27 may be displaced relative to each other such that the optical axes Oc of the collimation lenses 25 are offset from the optical axes $O_L$,Op of the light emitters 24 and pre-collimation lenses 27 so as to result in a direct-light direction 15 which is oblique relative to the plane within which the apertures of collimation lenses 25 are positioned and distributed, respectively.

Figure 4:
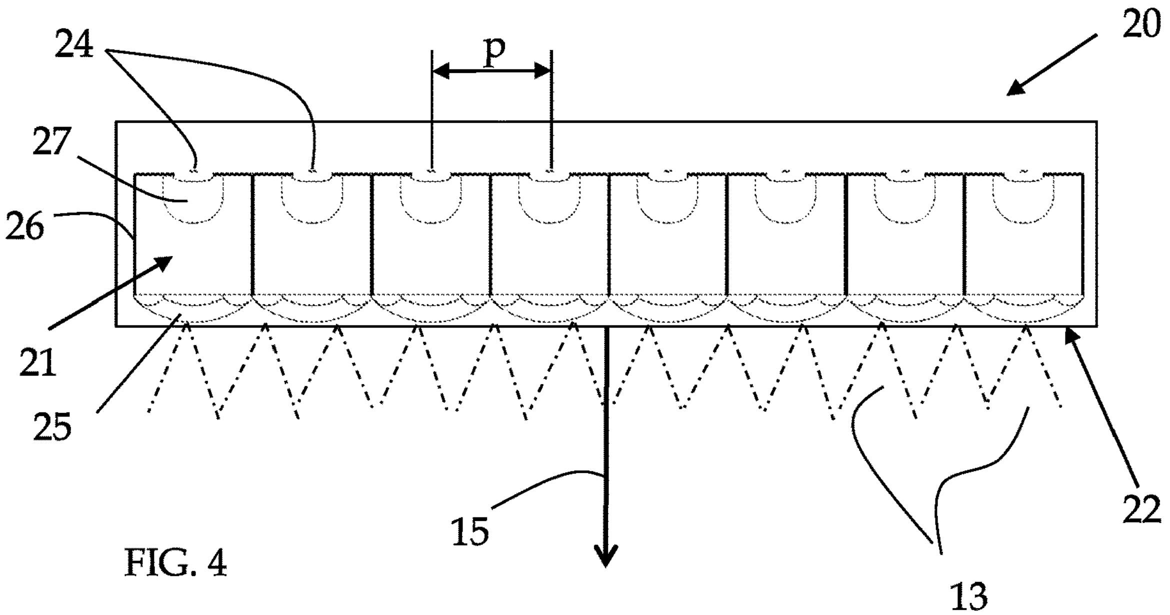
FIG. 4 schematically shows a sectional view of a second variant of a direct-light generator for sun-sky-imitating illumination devices according to the present invention.
Figure 4A:
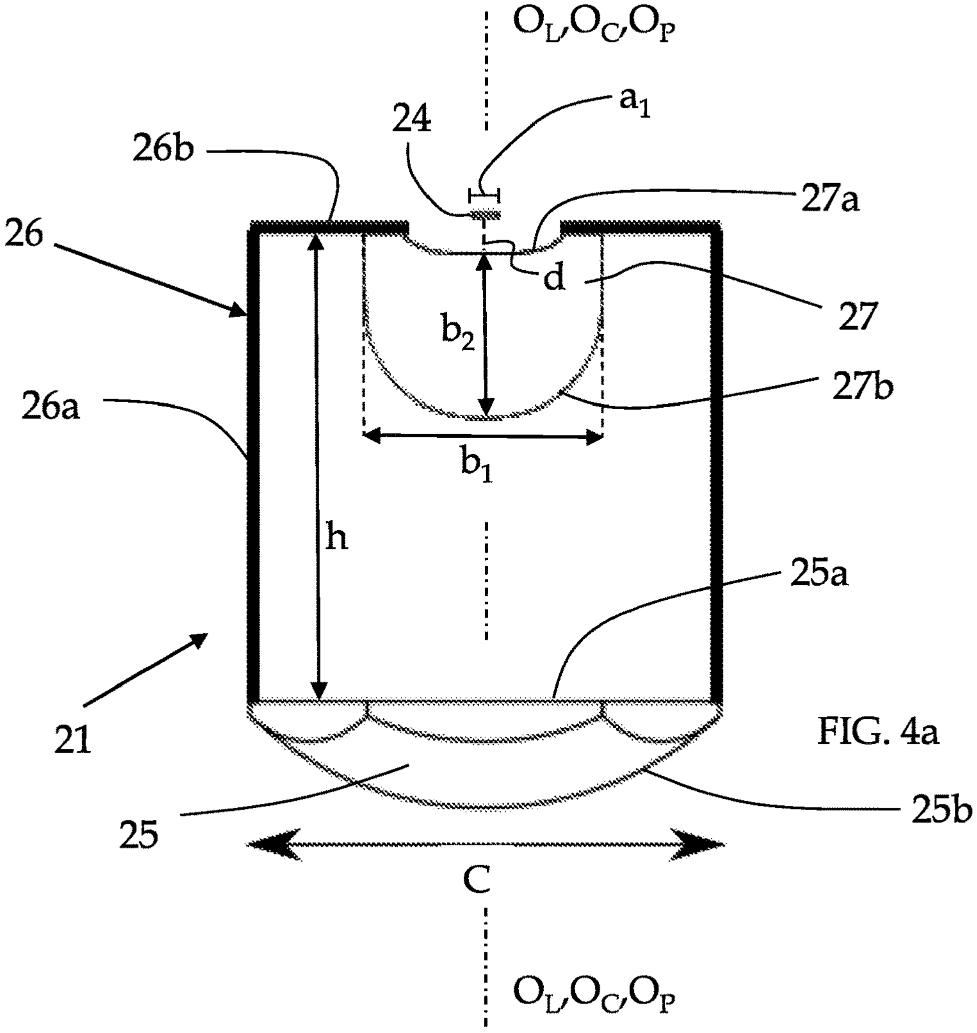
FIG. 4*a* is an enlarged view of a detail of the direct-light generator according to the second variant of FIG. 4.

In a second variant of the direct-light generator 20 according to the invention shown in FIG. 4, the first pre-collimation lens 27 comprises a concave-curved light inlet surface 27*a* facing the light emitter 24 and a convex-curved light outlet surface 27*b* having radius of curvature r1 measured at the optical axis $O_P$ of the pre-collimation lens 27. In particular, the inlet and the outlet surfaces 27*a*, 27*b* have both an aspheric profile. The pre-collimation lens 27 is preferably a singlet made of a thermoplastic polymer (e.g. PMMA).

As shown in FIG. 4*a*, the pre-collimation lens 27 is characterized by a maximum width b1 and a height b2 (measured as defined above with respect to the first variant of FIG. 2*a*). The pre-collimation lens 27 is positioned at a distance h from the collimation lens 25 (measured as defined above with respect to the first variant of FIG. 2*a*) and is characterized by a maximum width C of the collimation lens 25 (measured as defined above with respect to the first variant of FIG. 2*a*). The collimation lens output surface 25*b* is characterized by a radius of curvature r2 measured at the optical axis $O_C$ of the collimation lens 25.

At the optical axis $O_P$ of the pre-collimation lens 27, the light emitter 24 is spaced apart from the inlet surface 27*a* of the pre-collimation lens 27 of a gap d, which is however lower than a maximum value comprised between 0.01 and 0.04 times the distance h, preferably 0.015-0.035 times the distance h, even more preferably substantially equal to 0.025 times the distance h. With regard to the concave curved inlet surface 27*a* of the pre-collimation lens 27 of FIG. 4*a*, it is seen that the light emitter 24 is optionally positioned outside of the free space delimited by the curved light inlet surface 27*a*. Accordingly, the constraints on the gap d imply that the concave curved light inlet surface 27*a* has a maximum height (measured along the optical axis $O_P$ of the pre-collimation lens 27) which is less or at most equal to 0.01-0.04 times the distance h.

Also with respect to the above dimensions, Applicant identified that in order to minimize chromatic aberration and concurrently maximize light collimation offered by the light-emitting devices 21, the relation between the distance h and the maximum width C of the collimation lens 25 substantially corresponds to the relation between the height b2 and the maximum width b1 of the pre-collimation lens 27. In detail, Applicant identified that, both, the ratio C/h and the ratio b1/b2 are preferably comprised in the range of 0.8-1.6, more preferably comprised between 0.85 and 1.4, even more preferably between 0.90 and 1.3. Moreover, Applicant identified that the relation between the height b2 of the pre-collimation lens 27 and distance h is comprised in the range of 0.2-0.8, more preferably in the range between 0.25-0.75 and even more preferably in the range between 0.3-0.7. Analogously, Applicant further identified that the ratio b1/C between the pre-collimation lens width b1 and the collimation lens width C is comprised in the range of 0.3-0.8, more preferably in the range between 0.35-0.75 and even more preferably in the range between 0.4-0.7. Not least, Applicant also identified that the ratio a1/b1 between the width a1 of the light emitter 24 emitting surface (measured as defined above with respect to the first variant of FIG. 2*a*) and the pre-collimation lens 27 maximum width b1 preferably ranges between 0.2 (1:5) and 0.04 (1:25). Moreover, Applicant realized that ratio r2/r1 between the radius of curvature r2 of the light output surface 25*b* of the collimation lens 25 and the radius of curvature r1 of the light outlet surface 27*b* of the pre-collimation lens 27 needs to be comprised between 1.5 and 6, more preferably between 1.5 and 10. Also with regard to embodiment of FIG. 4, the collimation lens input surface 25*a* is flat.

Figure 5:
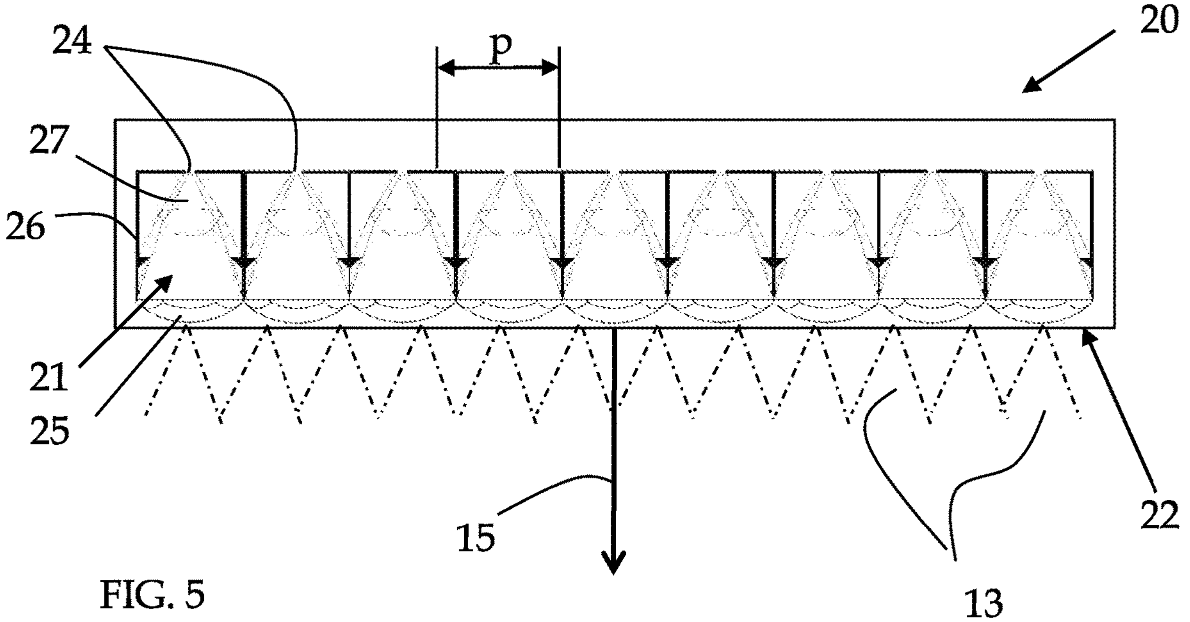
FIG. 5 schematically shows a sectional view of a third variant of a direct-light generator for sun-sky-imitating illumination devices according to the present invention.
Figure 5A:
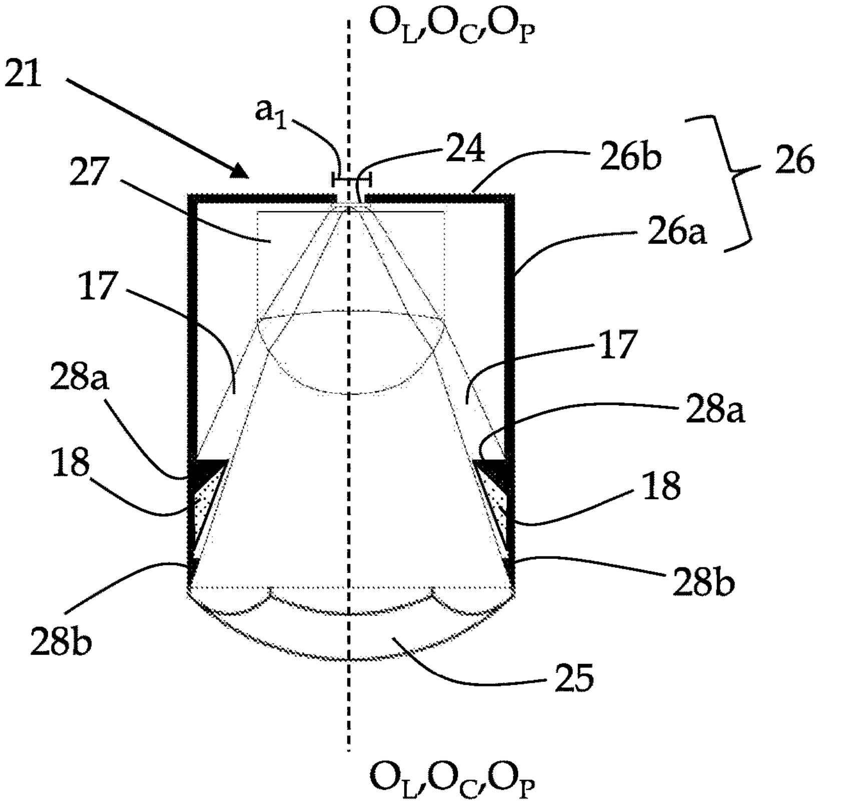
FIG. 5*a* is an enlarged view of a detail of the direct-light generator according to the third variant of FIG. 5.

FIGS. 5 and 5*a* show a third variant of the direct-light generator 20 according to the present invention which differs from the variant shown in FIG. 2 in the shape of the dark housings 26. According to the embodiment of FIGS. and 5*a*, the dark housing 26 of the light-emitting devices 21 comprises at least one first perimetric baffle structure 28*a* projecting from the inner walls of the dark housing 26 towards the inside of the dark housing 26. A first side of the baffle structure 28*a* which faces the pre-collimation lens 27 is preferably obtained parallel to the light emitter 24 emitting surface. According to a variant of the present invention, the first baffle structure 28*a* has a wedge-shaped section. Accordingly, a side of the baffle structure 28*a* which faces the collimation lens 25 is inclined with respect to the light emitter 24 emitting surface.

The first perimetric baffle structure 28*a* is configured to block a portion of the pre-collimated light 17 exiting the light outlet surface 27*b* of the pre-collimation lens 27 angularly more external with respect to the pre-collimation lens optical axis Op. Advantageously, the circular baffle structure 28*a* prevents that stray light is created through reflection of the pre-collimated light 17 onto a non-perfectly absorbing surface of the inner walls of the dark housing 26. As shown in FIG. 5*a* in more detail, downstream of the first perimetric baffle structure 28*a* (with respect to light propagation) a shadow area 18 is created on the inner walls of the dark housing 26.

The first baffle structure 28*a* is preferably positioned more proximal to the input surface 25*a* of the collimation lens 25 than to the inlet surface 27*a* of the pre-collimation lens 27. More preferably, the first baffle structure 28*a* is positioned at a distance from the input surface 25*a* of the collimation lens 25 which is less than half of the distance h between the two lenses 25,27, more preferably less than a third of the distance h.

According to a variant of the present invention, the dark housing 26 of the light-emitting devices 21 comprises a second perimetric baffle structure 28*b* projecting from the inner walls of the dark housing 26 towards the inside of the dark housing 26 and positioned between the first baffle structure 28*a* and the input surface 25*a* of the collimation lens 25. The second perimetric baffle structure 28*b* preferably extends towards the inside of the dark housing 26 less than the first perimetric baffle structure 28*a* and is configured to block possible residual pre-collimated light 17 directed towards the inner walls of the dark housing 26. This further avoids possible reflections due to a non-ideality in the absorption offered by the dark housing 26 and accordingly reduces stray light even more.

Figure 6:
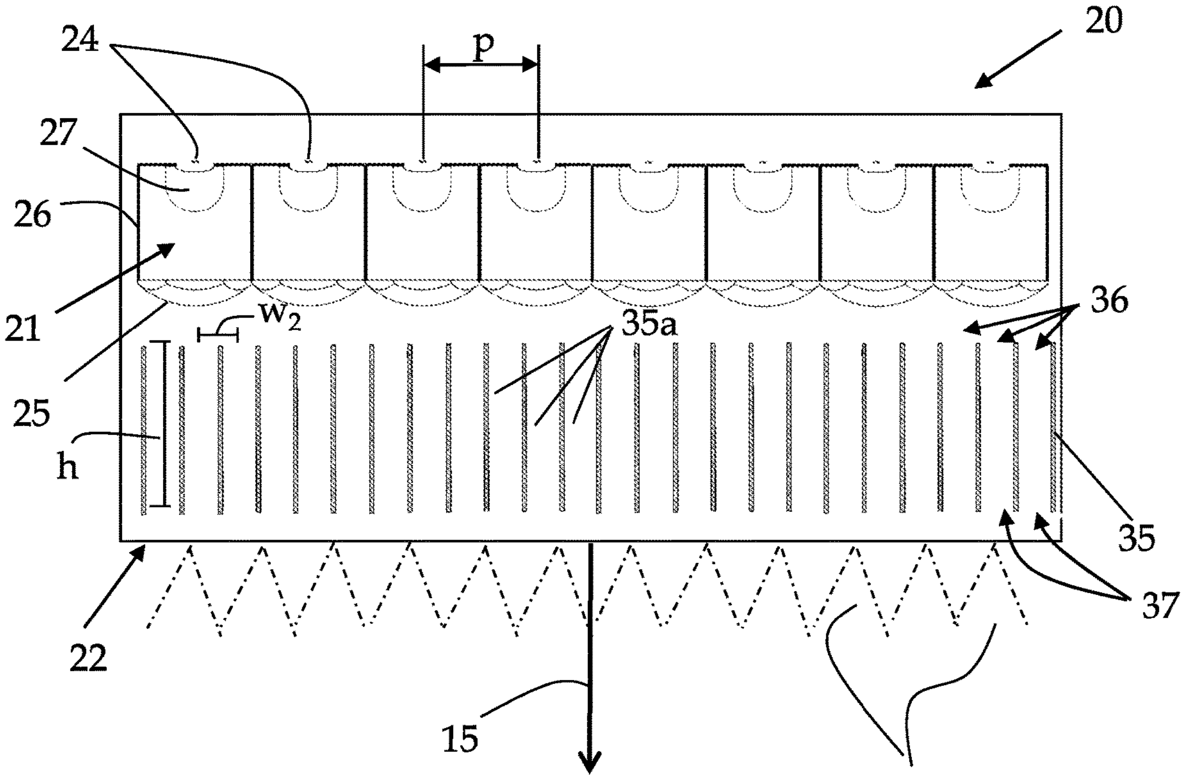
FIG. 6 schematically shows a sectional view of a fourth variant of a direct-light generator for sun-sky-imitating illumination devices according to the present invention provided internally with a channel structure.

FIG. 6 shows a fourth variant of the direct-light source 20 of the invention which additionally to the second variant shown in FIG. 4 comprises a three-dimensional channel structure 35 positioned directly downstream of the array of triplets of light emitter 24, pre-collimation lens 27 and respective collimation lens 25. The channel structure 35 thus positioned, is able to transform a first collimated light beam featured by the presence of stray light emitted by the light-emitting devices 21 and collimated by the pair of collimation lenses 27,25 and that impinges onto said channel structure 35 into a direct light 13 which is free from stray light propagating at an angle higher than a cut angle α_cut. Accordingly, the direct light 13 exiting the first emitting surface 22 is characterized by a reduced stray light, e.g. with a luminance profile with background below 1% of the peak luminance value.

Figure 7:
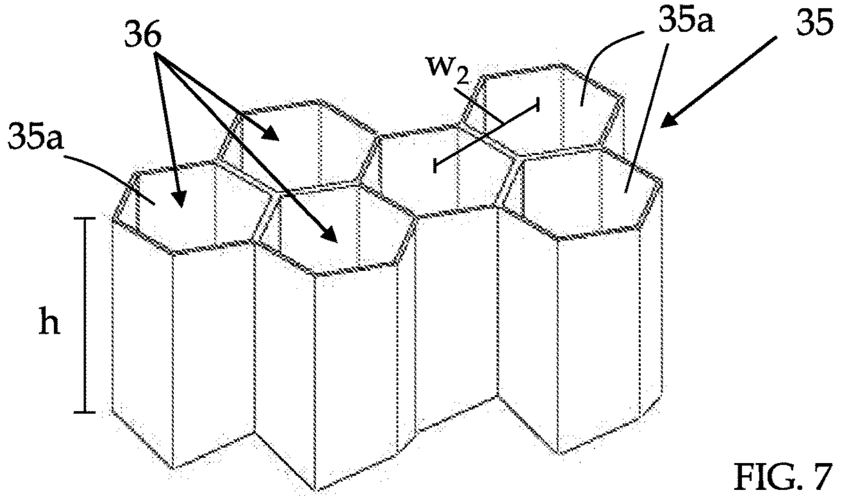
FIG. 7 is a schematic three-dimensional view of the channel structure of FIG. 6.

By instance, the channel structure 35 is made of a plurality of aligned channels 35*a*, which is preferably formed by void volumes separated by walls. The section of each channel 35*a* may be round, hexagonal or any other polygonal form. In case of hexagonal section, the channels are preferably distributed adjacent to each other so as to form a honeycomb structure as shown in FIG. 7. The walls separating the void volumes of the channels 35*a* are preferably made of or coated with a light absorbing material having an absorption coefficient η_abs for visible light preferably greater than 70%, more preferably 90%, even more preferably 95%. Each channel has substantially identical cross-sections in any plane parallel to the first emitting surface 22, such cross-sections having their barycenter aligned along the direct-light direction 15. Owing to this geometry, the channel structure 35 thus described is able to absorb light propagating through the same at an angle higher than a cut angle α_cut=a tan($w_2$/h), with $w_2$ being the width of the channels 35*a* and *h* being the height of the channels. For example, in case of hexagonal channels, the channel width $w_2$ is equal to double a side of the hexagonal section. Usual cut angles α_cut are preferably smaller than 45°, more preferably smaller than 30°, even more preferably smaller than 20°.

Even though not specifically depicted in the drawings, it is seen that the dark housing 26 comprising one or more baffle structures 28*a*,28*b* as described in relation to FIGS. 5 and 5*a* can be unrestrictedly and independently combined with the pre-collimation lens 27 as described in relation to FIGS. 4 and 4*a* and/or with the channel structure 35 of FIGS. 6 and 7, in order to achieve the advantages specifically deriving from a certain combination of the same.

The invention claimed is:

1. A direct-light generator for sun-sky-imitating illumination devices configured for generating natural light similar to that from the sun and the sky, comprising:

a first emitting surface and an array of light-emitting devices configured to generate a direct light which exits the first emitting surface along a direct-light direction, wherein the direct light exiting the first emitting surface has a luminance profile (Ldirect(x, y, θ, φ)) which has a peak in an angular distribution around the direct-light direction and is uniform across the first emitting surface, wherein each light-emitting device comprises a light emitter having an emitting surface and at least a pair of collimation lenses illuminated by the light emitter, each pair of collimation lenses comprising a pre-collimation lens comprising a light inlet surface facing the light emitter emitting surface and a light outlet surface, the pre-collimation lens being positioned proximal to the light emitter and a collimation lens comprising a light input surface and a light output surface, the collimation lens being positioned distal from the light emitter, the light emitter and the pre-collimation lens being housed in a hollow housing which is at least partially made of or internally coated with light absorbing material and has at least an aperture where the collimation lens is positioned, wherein the pre-collimation lens of each pair of collimation lenses is configured to emit with a substantially angularly constant intensity within an emission cone and to uniformly illuminate a whole light input surface of the collimation lens of the pair of collimation lenses, wherein, with the pre-collimation lens having a pre-collimation lens height (b2), and a base of the input surface of the collimation lens being spaced apart from a base of the inlet surface of the pre-collimation lens of a lenses distance (h), the ratio (b2/h) between the pre-collimation lens height (b2) and the lenses distance (h) is in the range of 0.2-0.8, in the range between 0.25-0.75, or in the range between 0.3-0.7; and/or wherein, with the pre-collimation lens having a pre-collimation lens maximum width (b1) and the collimation lens having a collimation lens maximum width (C), the ratio (b1/C) between the pre-collimation lens maximum width (b1) and the collimation lens maximum width (C) is in the range of 0.3-0.85, in the range between 0.35-0.75, or in the range between 0.4-0.7.

2. The direct-light generator of claim 1, wherein the ratio (C/h) between the collimation lens maximum width (C) and the lenses distance (h) and the ratio (b1/b2) between the pre-collimation lens maximum width (b1) and the pre-collimation lens height (b2) is in the range between 0.8-1.6, in the range between 0.85 and 1.4, or in the range between 0.90 and 1.3; and/or wherein the ratio (a1/b1) between a width (a1) of the light emitter emitting surface and the pre-collimation lens maximum width (b1) is between 0.2 (1:5) and 0.04 (1:25).

3. The direct-light generator of claim 1, wherein the light emitter emitting surface is spaced apart from the light inlet surface of the pre-collimation lens by a gap (d) lower than a maximum value that is between 0.01 and 0.04 times the lenses distance (h), 0.015-0.035 times the lenses distance (h), or substantially equal to 0.025 times the lenses distance (h).

4. The direct-light generator of claim 1, wherein the light output surface of the collimation lens is convex-curved.

5. The direct-light generator of claim 4, wherein the pre-collimation lens has a first optical axis ($O_P$) and the light outlet surface of the pre-collimation lens has a first radius of curvature (r1) measured at the first optical axis ($O_P$), and the collimation lens has a second optical axis ($O_C$) and the light output surface of the collimation lens has a second radius of curvature (r2) measured at the second optical axis ($O_C$), wherein a ratio (r2/r1) between the second radius of curvature (r2) of the light output surface of the collimation lens and the first radius of curvature (r1) of the light outlet surface of the pre-collimation lens ranges between 1.5 and 6, or between 1.5 and 10.

6. The direct-light generator of claim 5, wherein the light input surface of the collimation lens has a third radius of curvature (r3) measured at the second optical axis ($O_C$), the third radius of curvature (r3) being larger than the second radius of curvature (r2) of the light output surface of the collimation lens, larger than three times the second radius of curvature (r2) of the light output surface of the collimation lens, larger than five times the second radius of curvature (r2) of the light output surface of the collimation lens, or larger than ten times the second radius of curvature (r2) of the light output surface of the collimation lens.

7. The direct-light generator of claim 1, wherein the light outlet surface of the pre-collimation lens and/or the light output surface of the collimation lens have a spherical or an aspheric profile.

8. The direct-light generator of claim 1, wherein the hollow housing is internally coated or made of light absorbing material having an absorption coefficient for visible light greater than 70%, greater than 90%, or greater than 95%; and/or comprises at least one perimetric baffle structure projecting from an inner wall of the hollow housing towards the inside of the hollow housing and configured to prevent that pre-collimated light exiting the light outlet surface of the pre-collimation lens impinges onto the inner wall of the hollow housing.

9. The direct-light generator of claim 8, wherein the at least one perimetric baffle structure is positioned more proximal to the input surface of the collimation lens than to the inlet surface of the pre-collimation lens, the first baffle structure is positioned at a distance from the input surface of the collimation lens which is less than half of the lenses distance (h), or at a distance from the input surface of the collimation lens that is less than a third of the lenses distance (h).

10. The direct-light generator of claim 8, wherein the at least one perimetric baffle structure has a wedge-shaped cross-section with a side of the perimetric baffle structure facing the pre-collimation lens being parallel to the collimation lens inlet surface base.

11. The direct-light generator of claim 1, wherein the concave-curved light inlet surface of the pre-collimation lens has an aspheric profile.

12. The direct-light generator of claim 1, wherein the pre-collimation lens is at least one of:

a singlet made of a thermoplastic polymer;

a glass doublet; and a thermoplastic polymer doublet.

13. A direct-light generator comprising:

an array of light-emitting devices configured to generate, from a primary light, a direct light which exits a first emitting surface along a direct-light direction, wherein the direct light exiting the first emitting surface has a luminance profile which has a peak in an angular distribution around the direct-light direction and is uniform across the first emitting surface, wherein each light-emitting device comprises a light emitter having an emitting surface and at least a pair of collimation lenses illuminated by the light emitter, each pair of collimation lenses comprising a pre-collimation lens comprising a light inlet surface facing the light emitter emitting surface and a light outlet surface, the pre-collimation lens being positioned proximal to the light emitter and a collimation lens comprising a light input surface and a light output surface, the collimation lens being positioned distal from the light emitter, wherein the pre-collimation lens of each pair of collimation lenses is configured to emit with a substantially angularly constant intensity within an emission cone and to uniformly illuminate a whole light input surface of the collimation lens of the pair of collimation lenses, wherein the pre-collimation lens has a convex-curved light outlet surface and a concave-curved light inlet surface facing the light emitter.

14. The direct-light generator of claim 13, wherein with the pre-collimation lens having a pre-collimation lens height (b2), and a base of the input surface of the collimation lens being spaced apart from a base of the inlet surface of the pre-collimation lens of a lenses distance (h), the ratio (b2/h) between the pre-collimation lens height (b2) and the lenses distance (h) is in the range of 0.2-0.8, in the range between 0.25-0.75, or in the range between 0.3-0.7.

15. The direct-light generator of claim 13, wherein, with the pre-collimation lens having a pre-collimation lens maximum width (b1) and the collimation lens having a collimation lens maximum width (C), the ratio (b1/C) between the pre-collimation lens maximum width (b1) and the collimation lens maximum width (C) is in the range of 0.3-0.85, in the range between 0.35-0.75, or in the range between 0.4-0.7.

16. The direct-light generator of claim 13, wherein the light outlet surface of the pre-collimation lens and/or the light output surface of the collimation lens have a spherical or an aspheric profile.

17. The direct-light generator of claim 13, wherein the light emitter and the pre-collimation lens are housed in a hollow housing which is at least partially made of or internally coated with light absorbing material and has at least an aperture where the collimation lens is positioned, wherein the hollow housing is internally coated or made of light absorbing material having an absorption coefficient for visible light greater than 70%, greater than 90%, or greater than 95%; and/or comprises at least one perimetric baffle structure projecting from an inner wall of the hollow housing towards the inside of the hollow housing and configured to prevent that pre-collimated light exiting the light outlet surface of the pre-collimation lens impinges onto the inner wall of the hollow housing.

18. The direct-light generator of claim 13, wherein the concave-curved light inlet surface of the pre-collimation lens has an aspheric profile.

19. The direct-light generator of claim 13, wherein the pre-collimation lens is at least one of:

a singlet made of a thermoplastic polymer;

a glass doublet; and a thermoplastic polymer doublet.

20. A direct-light generator comprising:

an array of light-emitting devices configured to generate, from a primary light, a direct light that exits a first emitting surface along a direct light direct-light direction, wherein the direct light exiting the first emitting surface has a luminance profile that has a narrow peak in an angular distribution around the direct-light direction and is uniform across the first emitting surface, each light-emitting device comprises a light emitter having an emitting surface and at least a pair of collimation lenses illuminated by the light emitter, each pair of collimation lenses comprising:

a collimation lens comprising a light input surface and a light output surface; and a pre-collimation lens comprising a light inlet surface facing the light emitter emitting surface and a light outlet surface, the pre-collimation lens being positioned proximal to the light emitter and between the light emitter and the collimation lens such that any gap between the light emitter and the light inlet surface is less than 0.035 times a distance between the pre-collimation lens and the collimation lens.

21. The direct-light generator of claim 20, wherein each pre-collimation lens is configured to emit with a substantially angularly constant intensity within an emission cone.

22. The direct-light generator of claim 20, wherein the pre-collimation lens and the collimation lens are positioned next to each other.

* * * * *